US012408224B2

United States Patent
Lim et al.

(10) Patent No.: US 12,408,224 B2
(45) Date of Patent: Sep. 2, 2025

(54) RADIO LINK MONITORING AND FAILURE FOR NEW RADIO-UNLICENSED OPERATION

(71) Applicant: Apple Inc., Cupertino, CA (US)

(72) Inventors: Seau S. Lim, Swindon (GB); Yongjun Kwak, Portland, OR (US); Anthony Lee, San Diego, CA (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 553 days.

(21) Appl. No.: 17/275,404

(22) PCT Filed: Sep. 16, 2019

(86) PCT No.: PCT/US2019/051321
§ 371 (c)(1),
(2) Date: Mar. 11, 2021

(87) PCT Pub. No.: WO2020/068472
PCT Pub. Date: Apr. 2, 2020

(65) Prior Publication Data
US 2022/0061116 A1 Feb. 24, 2022

Related U.S. Application Data

(60) Provisional application No. 62/737,480, filed on Sep. 27, 2018.

(51) Int. Cl.
*H04W 76/19* (2018.01)
*H04L 5/00* (2006.01)
(Continued)

(52) U.S. Cl.
CPC ........... *H04W 76/19* (2018.02); *H04L 5/0048* (2013.01); *H04L 5/0053* (2013.01);
(Continued)

(58) Field of Classification Search
None
See application file for complete search history.

(56) References Cited

U.S. PATENT DOCUMENTS

| 2011/0256861 A1 | 10/2011 | Yoo et al. |
| 2014/0043988 A1 | 2/2014 | Chen et al. |

(Continued)

FOREIGN PATENT DOCUMENTS

| CN | 104509018 A | 4/2015 |
| CN | 105814928 | 7/2016 |

(Continued)

OTHER PUBLICATIONS

U.S. Appl. No. 62/716,020, filed Aug. 8, 2018 (Year: 2018).*
(Continued)

*Primary Examiner* — Jay L Vogel
(74) *Attorney, Agent, or Firm* — Kowert, Hood, Munyon, Rankin & Goetzel, P.C.

(57) ABSTRACT

Systems and methods of in-sync/out-of-sync (IS/OOS) determination in the unlicensed band are described. Reference signals are measured on the unlicensed band. If the UE determines that at least one of the reference signals is missing, the IS/OOS condition is evaluated on that basis. If the missing signals are ignored when determining the IS/OOS condition, and the IS/OOS condition is unable to evaluated, the L1 sends an indication to the RRC layer. If the number of indications exceeds a threshold, the UE performs re-establishment or sends a report to the base station for adjustment of the reference signal resources. If the missing signals are counted, the missing signals are weighted based on proximity to the noise floor or a number of adjacent signals that are missing.

20 Claims, 3 Drawing Sheets

(51) Int. Cl.
  *H04L 41/0654* (2022.01)
  *H04W 24/08* (2009.01)
  *H04W 56/00* (2009.01)

(52) U.S. Cl.
  CPC ......... *H04L 41/0654* (2013.01); *H04W 24/08* (2013.01); *H04L 5/001* (2013.01); *H04W 56/00* (2013.01)

(56) References Cited

U.S. PATENT DOCUMENTS

| | | | |
|---|---|---|---|
| 2014/0211655 A1 | 7/2014 | Yoo et al. | |
| 2016/0007378 A1 | 1/2016 | Bertorelle et al. | |
| 2017/0311316 A1* | 10/2017 | Chendamarai Kannan | H04W 72/0446 |
| 2018/0007575 A1* | 1/2018 | Singhal | H04W 76/15 |
| 2018/0027437 A1* | 1/2018 | Vitthaladevuni | H04L 5/006 370/252 |
| 2018/0084432 A1* | 3/2018 | Kwak | H04W 74/0808 |
| 2018/0160328 A1* | 6/2018 | Chendamarai Kannan | H04B 7/0632 |
| 2018/0279401 A1* | 9/2018 | Hong | H04W 36/0064 |
| 2018/0287870 A1* | 10/2018 | Yerramalli | H04L 5/0064 |
| 2018/0343588 A1* | 11/2018 | Sadek | H04W 28/26 |
| 2019/0037481 A1* | 1/2019 | Zhang | H04L 5/0032 |
| 2019/0261244 A1* | 8/2019 | Jung | H04W 36/305 |
| 2020/0396627 A1* | 12/2020 | Hwang | H04W 24/08 |
| 2021/0099899 A1* | 4/2021 | Wu | H04W 80/02 |
| 2021/0321277 A1* | 10/2021 | Murray | H04W 56/001 |

FOREIGN PATENT DOCUMENTS

| | | |
|---|---|---|
| GB | 2507570 A | 5/2014 |
| WO | 2016054584 A2 | 4/2016 |
| WO | 2016144002 A1 | 9/2016 |
| WO | 2016163854 A1 | 10/2016 |
| WO | WO-2017092810 A1 * | 6/2017 |
| WO | 2018/030016 A1 | 2/2018 |
| WO | 2018/084798 A1 | 5/2018 |
| WO | 2018102650 | 6/2018 |
| WO | 2018/143776 A1 | 8/2018 |

OTHER PUBLICATIONS

Provisional application, Hwang, U.S. Appl. No. 62/616,435, filed Jan. 12, 2018 (Year: 2018).*
International Search Report and Written Opinion for International Application No. PCT/US2019/051321, mailed Jan. 3, 2020, 8 pgs.
Notification to Grant Patent Right for Invention; Chinese Application No. 201980060911.4; mailed Apr. 20, 2022; 7 pgs.
Extended European Search Report; European Application No. 19864471.8; mailed Oct. 20, 2021; 5 pgs.
Office Action for CN 2022107736326; Feb. 6, 2025.

* cited by examiner

RADIO LINK MONITORING AND FAILURE FOR NEW RADIO-UNLICENSED OPERATION

This application is a U. S. National Stage filing of International Application No. PCT/US2019/051321, filed Sep. 16, 2019, which claims the benefit of priority to U.S. Provisional Patent Application Ser. No. 62/737,480, filed Sep. 27, 2018, each of which is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to unlicensed band use in 5G systems.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system, 5G or NR, will provide ubiquitous connectivity and access to information, as well as ability to share data, by various users and applications. NR is expected to be a unified framework that targets to meet starkly different and sometimes, conflicting performance criteria and services. In general, NR will evolve based on 3GPP LTE-Advanced technology with additional enhanced radio access technologies (RATs) to enable seamless wireless connectivity solutions. An increasing number of these solutions involve the issue of the massive increase in number of UEs in use. In particular, a number of developments have focused on the use of the unlicensed spectrum to provide additional communication channels with which the eNBs/gNBs and UEs communicate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
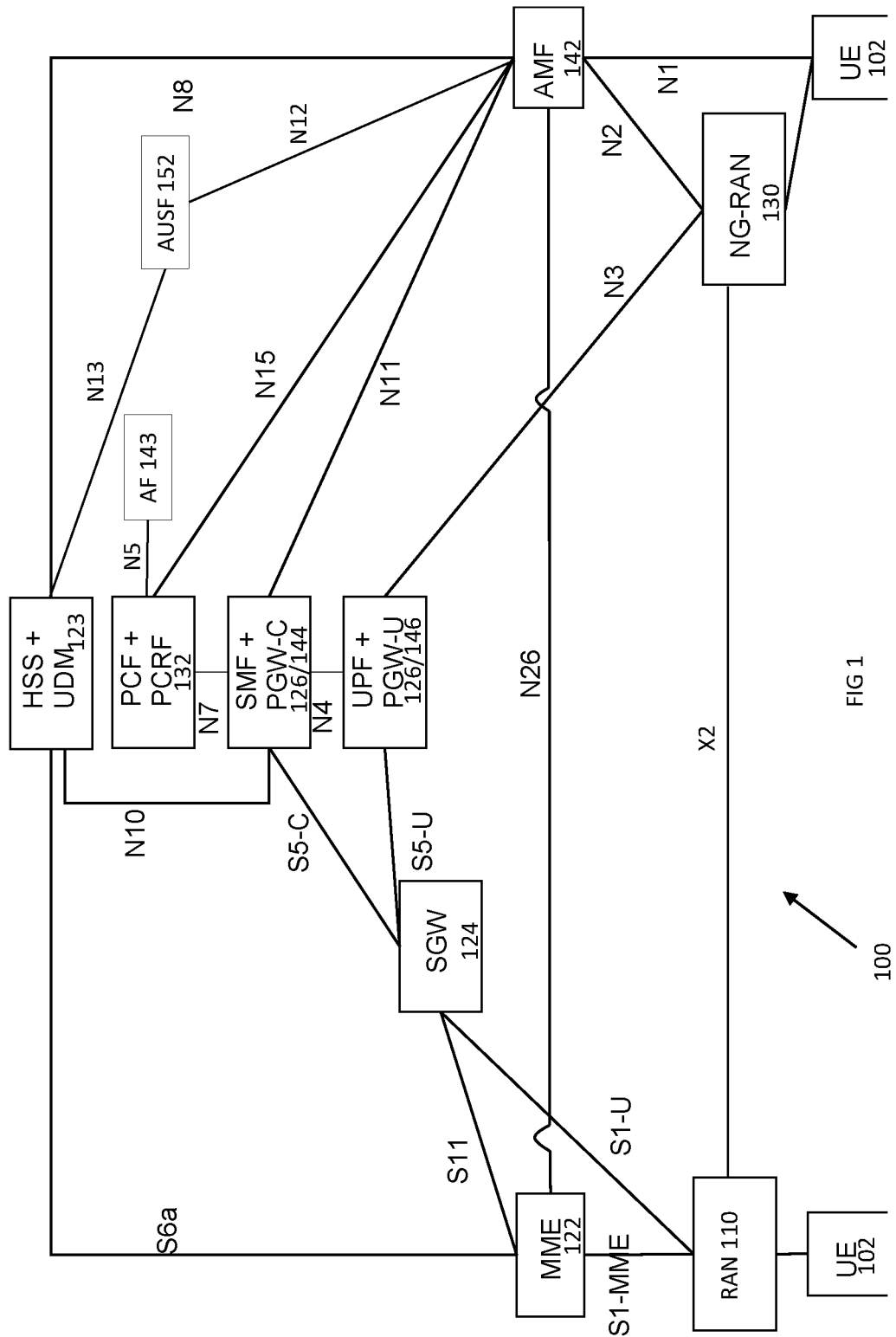
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to a radio access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 146 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
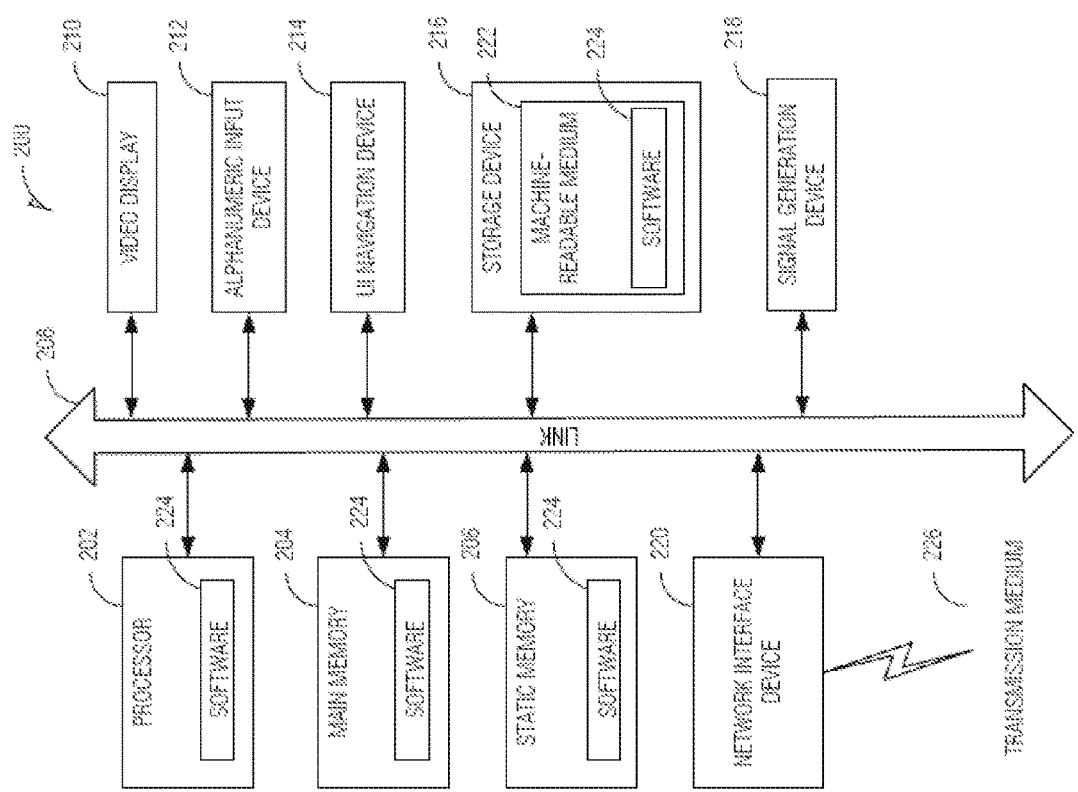
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, UEs may operate in licensed spectrum. However, the paucity of licensed spectrum in LTE and NR frequency bands may result in insufficient bandwidth to supply all UEs for communication, leading to a reduction in data throughput. To increase further the system throughput, NR and LTE systems operate in unlicensed spectrum. Potential NR and LTE operation in unlicensed spectrum includes, but is not limited to, Carrier Aggregation (CA) based on Licensed Assisted Access (LAA)/enhanced LAA (eLAA) systems, NR and LTE operation in the unlicensed spectrum via dual connectivity (DC), and standalone NR and LTE systems in the unlicensed spectrum.

When using the unlicensed bands, communication devices such as base stations (eNBs/gNBs) and UEs may determine channel availability via energy detection before transmitting data on the channel. For example, the communication device may determine that the channel is occupied through a predetermined amount of energy being present in the channel or via a change in a received signal strength indication (RSSI). The communication device may detect the presence of a specific sequence, such as a preamble transmitted prior to a data transmission, that indicates use of the channel. The unlicensed channel may be reserved using a reservation signal to prevent WiFi signals from initiating transmission until the next frame boundary event. Thus, communication devices may contend for access to the unlicensed frequency band by performing clear channel assessment (CCA) procedures, and subsequently transmitting during transmission opportunities (TxOPs).

In particular, UEs may also measure radio link quality on channels of both the licensed and unlicensed bands. Radio Link Monitoring (RLM) refers to mechanisms used by the UE for monitoring the downlink (DL) radio link quality of a primary cell (Pcell) to indicate in-sync (IS)/out-of-sync (OOS) status to higher layers. While the UE may monitor active DL bandwidth parts (BWPs) on the Pcell, in some cases, the UE may avoid monitoring the DL radio link quality in DL BWPs other than the active DL BWP on the Pcell.

Similarly, if the UE is configured with a secondary cell group (SCG), and the parameter rlf-TimersAndConstants is provided by the higher layers and is not set to release, the DL radio link quality of the primary secondary cell (PSCell) of the SCG may be monitored by the UE to indicate IS/OOS status to higher layers. The UE, similar to the PCell, may avoid monitoring of the downlink radio link quality in DL BWPs other than the active DL BWP on the PSCell.

The UE can be configured for each DL BWP of an SpCell with a set of resource indexes, through a corresponding set of higher layer parameters RadioLinkMonitoringRS, for radio link monitoring by higher layer parameter failureDetectionResources. The UE may be provided by higher layer parameter RadioLinkMonitoringRS, with either a channel-state information reference signal (CSI-RS) resource configuration index, by higher layer parameter csi-RS-Index, or a synchronization signal (SS)/Physical Broadcast Channel (PBCH) block index, by higher layer parameter ssb-Index. The UE can be configured with up to $N_{LR-RLM}$ RadioLinkMonitoringRS for link recovery procedures, and radio link monitoring. From the $N_{LR-RLM}$ RadioLinkMonitoringRS, up to $N_{LR-RLM}$ RadioLinkMonitoringRS can be used for radio link monitoring depending on a maximum number L of candidate SS/PBCH blocks per half frame, and up to two RadioLinkMonitoringRS can be used for link recovery procedures.

If the UE is not provided higher layer parameter RadioLinkMonitoringRS and the UE is provided by higher layer parameter TCI-state for one or more RSs of a Physical Downlink Control Channel (PDCCH) that include one or more of a CSI-RS and/or a SS/PBCH block, the UE may engage in several activities. The UE may use for radio link monitoring the RS provided for the active Transmission Configuration Indicator (TCI) state for the PDCCH if the active TCI state for the PDCCH includes only one RS. If the active TCI state for the PDCCH includes two RS, the UE may expect that one RS has Quasi Co-Location (QCL)-TypeD and the UE may use that RS for radio link monitoring; the UE may not expect both RS to have QCL-TypeD. The UE may not use an aperiodic RS for radio link monitoring. The UE is not expected to use more than $N_{RLM}$ RadioLinkMonitoringRS for radio link monitoring when the UE is not provided higher layer parameter RadioLinkMonitoringRS.

Values of $N_{LR-RLM}$ and $N_{RLM}$ for different values of L are given in Table RLM-1.

TABLE RLM-1

$N_{LR-RLM}$ and $N_{RLM}$ as a function of maximum number L of SS/PBCH blocks per half frame

| L | $N_{LR-RLM}$ | $N_{RLM}$ |
|---|---|---|
| 4 | 2 | 2 |
| 8 | 6 | 4 |
| 64 | 8 | 8 |

For a CSI-RS resource configuration, the higher layer parameter powerControlOffsetSS may not be applicable and a UE may instead expect to be provided only 'No CDM' from higher layer parameter cdm-Type, only '1' and '3' from higher layer parameter density, and only '1 port' from higher layer parameter nrofPorts.

In non-DRX mode operation, the physical layer in the UE may assess the radio link quality once per indication period. The radio link quality may be evaluated over the previous time period against thresholds ($Q_{out}$ and $Q_{in}$) configured by higher layer parameter rlmInSyncOutOfSyncThreshold. The UE may determine the indication period as the maximum between the shortest periodicity for radio link monitoring resources and 10 msec.

In DRX mode operation, similar to the above, the physical layer in the UE may assess the radio link quality once per indication period. The radio link quality may be evaluated over the previous time period against thresholds ($Q_{out}$ and $Q_{in}$) configured by higher layer parameter rlmInSyncOutOfSyncThreshold. The UE may determine the indication period as the maximum between the shortest periodicity for radio link monitoring resources and the DRX period.

The physical layer in the UE may indicate, in frames where the radio link quality is assessed, out-of-sync to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, the physical layer in the UE may indicate, in frames where the radio link quality is assessed, in-sync to higher layers.

The UE may monitor the downlink link quality based on the reference signal in the configured RLM-RS resource(s) to detect the downlink radio link quality of the PCell and PSCell. The configured RLM-RS resources can be all SSBs, all CSI-RSs, or a mix of SSBs and CSI-RSs. The UE may or may not perform RLM outside the active DL BWP. The RS for RLM (RLM-RS) resource is a resource out of the set of resources configured for RLM by higher layer parameter RLM-RS-List.

On each RLM-RS resource, the UE may estimate the downlink radio link quality and compare the estimate to the thresholds $Q_{out}$ and $Q_{in}$ to monitor downlink radio link quality of the cell. The threshold $Q_{out}$ is defined as the level at which the downlink radio link cannot be reliably received and is to correspond to the out-of-sync block error rate ($BLER_{out}$) as defined in Table RLM.1-1. For SSB-based radio link monitoring, $Q_{out}$ SSB is derived based on the hypothetical PDCCH transmission parameters listed in Table RLM.2-1. For CSI-RS based radio link monitoring, $Q_{out\_CSI-RS}$ is derived based on the hypothetical PDCCH transmission parameters listed in Table RLM.3-1. The threshold $Q_{in}$ is defined as the level at which the downlink radio link quality can be significantly more reliably received than at $Q_{out}$ and is to correspond to the in-sync block error rate ($BLER_{in}$) as defined in Table RLM.1-1. For SSB based radio link monitoring, $Q_{in\_SSB}$ is derived based on the hypothetical PDCCH transmission parameters listed in Table RLM.2-2. For CSI-RS based radio link monitoring, $Q_{in\_CSI-RS}$ is derived based on the hypothetical PDCCH transmission parameters listed in Table RLM.3-2.

The out-of-sync block error rate ($BLER_{out}$) and in-sync block error rate ($BLER_{in}$) may be determined from the network configuration via parameter RLM-IS-OOS-thresholdConfig signalled by higher layers. The network can configure one of the two pairs of out-of-sync and in-sync block error rates which are shown in Table RLM.1-1. When the UE is not configured with RLM-IS-OOS-thresholdConfig from the network, the UE may determine out-of-sync and in-sync block error rates from Configuration #0 in Table RLM.1-1 as a default.

TABLE RLM.1-1

Out-of-sync and in-sync block error rates

| Configuration | $BLER_{out}$ | $BLER_{in}$ |
|---|---|---|
| 0 | 10% | 2% |
| 1 | TBD | TBD |

UE is to be able to monitor up to $X_{RLM-RS}$ RLM-RS resources of the same or different types in each corresponding carrier frequency range, where $X_{RLM-RS}$ is specified in Table RLM.1-2 as below.

TABLE RLM.1-2

Maximum number of RLM-RS resources $X_{RLM-RS}$

| Maximum number of RLM-RS resources, $X_{RLM-RS}$ | Carrier frequency range of PCell/PSCell |
|---|---|
| 2 | FR1, ≤3 GHz |
| 4 | FR1, >3 GHz |
| 8 | FR2 |

SSB Based Radio Link Monitoring

Each SSB-based RLM-RS resource may be configured for a PCell and/or a PSCell provided that the SSB configured for RLM are actually transmitted within the UE active DL BWP during the entire evaluation period specified below.

TABLE RLM.2-1

PDCCH transmission parameters for out-of-sync

| Attribute | Value for BLER pair#0 | Value for BLER pair#1 |
|---|---|---|
| DCI format | 1-0 | TBD |
| Number of control OFDM symbols | Same as the number of symbols of RMSI CORESET | |
| Aggregation level (CCE) | 8 | |
| Ratio of hypothetical PDCCH RE energy to average SSS RE energy | 4 dB | |
| Ratio of hypothetical PDCCH DMRS energy to average SSS RE energy | 4 dB | |
| Bandwidth (MHz) | Same as the number of PRBs of RMSI CORESET | |
| Sub-carrier spacing (kHz) | Same as the SCS of RMSI CORESET | |
| DMRS precoder granularity | REG bundle size | |
| REG bundle size | 6 | |
| CP length | Same as the CP length of RMSI CORESET | |
| Mapping from REG to CCE | Distributed | |

TABLE RLM.2-2

PDCCH transmission parameters for in-sync

| Attribute | Value for BLER pair#0 | Value for BLER pair#1 |
|---|---|---|
| DCI payload size | 1-0 | TBD |
| Number of control OFDM symbols | Same as the number of symbols of RMSI CORESET | |
| Aggregation level (CCE) | 4 | |
| Ratio of hypothetical PDCCH RE energy to average SSS RE energy | 0 dB | |
| Ratio of hypothetical PDCCH DMRS energy to average SSS RE energy | 0 dB | |
| Bandwidth (MHz) | Same as the number of PRBs of RMSI CORESET | |
| Sub-carrier spacing (kHz) | Same as the SCS of RMSI CORESET | |
| DMRS precoder granularity | REG bundle size | |
| REG bundle size | 6 | |
| CP length | Same as the CP length of RMSI CORESET | |
| Mapping from REG to CCE | Distributed | |

The UE may be able to evaluate whether the downlink radio link quality on the configured RLM-RS resource estimated over the last $T_{Evaluate\_out\_SSB}$ [ms] period becomes worse than the threshold $Q_{out\_SSB}$ within $T_{Evaluate\_out\_SSB}$ [ms] evaluation period. Similarly, the UE may be able to evaluate whether the downlink radio link quality on the configured RLM-RS resource estimated over the last $T_{Evaluate\_in\_SSB}$ [ms] period becomes better than the threshold $Q_{in\_SSB}$ within $T_{Evaluate\_in\_SSB}$ [ms] evaluation period.

$T_{Evaluate\_out\_SSB}$ and $T_{Evaluate\_in\_SSB}$ are defined in Table RLM.2-3 for FR1. $T_{Evaluate\_out\_SSB}$ and $T_{Evaluate\_in\_SSB}$ are defined in Table RLM.2-4 for FR2 with N=1, if the SSB configured for RLM is spatially QCLed and TDMed to CSI-RS resources configured for BM, and the QCL association is known to UE.

For FR1, $P=1/(1-T_{SSB}/MGRP)$, (where MGRP is the Measurement Gap Repetition Period) when in the monitored cell there are measurement gaps configured for intra-frequency, inter-frequency or inter-RAT measurements, which are overlapping with some but not all occasions of the SSB; and P=1 when in the monitored cell there are no measurement gaps overlapping with any occasion of the SSB. For FR2, $P=1/(1-T_{SSB}/T_{SMTCperiod})$, when RLM-RS is not overlapped with measurement gap and RLM-RS is partially overlapped with SMTC occasion $(T_{SSB}<T_{SMTCperiod})$. P is $P_{sharing\ factor}$, when RLM-RS is not overlapped with measurement gap and RLM-RS is fully overlapped with SMTC period $(T_{SSB}=T_{SMTCperiod})$. P is $1/(1-T_{SSB}/MGRP-T_{SSB}/T_{SMTCperiod})$, when RLM-RS is partially overlapped with measurement gap and RLM-RS is partially overlapped with SMTC occasion $(T_{SSB}<T_{SMTCperiod})$ and SMTC occasion is not overlapped with measurement gap, and $T_{SMTCperiod}$ MGRP or $T_{SMTCperiod}=MGRP$ and $T_{SSB}<0.5*T_{SMTCperiod}$. P is $1/(1-T_{SSB}/MGRP)*P_{sharing\ factor}$, when RLM-RS is partially overlapped with measurement gap and RLM-RS is partially overlapped with SMTC occasion $(T_{SSB}<T_{SMTCperiod})$ and SMTC occasion is not overlapped with measurement gap and $T_{SMTCperiod}=MGRP$ and $T_{SSB}=0.5*T_{SMTCperiod}$. P is $1/\{1-T_{SSB}/\min(T_{SMTCperiod},$ MGRP)}, when RLM-RS is partially overlapped with measurement gap and RLM-RS is partially overlapped with SMTC occasion $(T_{SSB}<T_{SMTCperiod})$ and SMTC occasion is partially overlapped with measurement gap $(T_{SMTCperiod}$ MGRP). P is $1/(1-T_{SSB}/MGRP)*P_{sharing\ factor}$, when RLM-RS is partially overlapped with measurement gap and RLM-RS is fully overlapped with SMTC occasion $(T_{SSB}=T_{SMTCperiod})$ and SMTC occasion is partially overlapped with measurement gap $(T_{SMTCperiod}<MGRP)$.

A longer evaluation period may be expected if the combination of RLM-RS, SMTC occasion and measurement gap configurations does not meet pervious conditions.

TABLE RLM.2-3

Evaluation period $T_{Evaluate\_out}$ and $T_{Evaluate\_in}$ for FR1

| Configuration | $T_{Evaluate\_out}$ (ms) | $T_{Evaluate\_in}$ (MS) |
|---|---|---|
| non-DRX | max(200, ceil(10 * P) * $T_{SSB}$) | max(100, ceil(5 * P) * $T_{SSB}$) |
| DRX cycle ≤ 320 | max(200, ceil(15 * P) * max($T_{DRX}$, $T_{SSB}$)) | max(100, ceil(7.5 * P) * max($T_{DRX}$, $T_{SSB}$)) |
| DRX cycle > 320 | ceil(10 * P) * $T_{DRX}$ | ceil(5 * P) * $T_{DRX}$ |

NOTE:
$T_{SSB}$ is the periodicity of SSB configured for RLM.
$T_{DRX}$ is the DRX cycle length.

TABLE RLM.2-4

Evaluation period $T_{Evaluate\_out}$ and $T_{Evaluate\_in}$ for FR2

| Configuration | $T_{Evaluate\_out}$ (ms) | $T_{Evaluate\_in}$ (MS) |
|---|---|---|
| non-DRX | max(200, ceil(10 * P * N) * $T_{SSB}$) | max(100, ceil(5 * P * N) * $T_{SSB}$) |
| DRX cycle ≤ 320 | max(200, ceil(15 * P * N) * max($T_{DRX}$, $T_{SSB}$)) | max(100, ceil(7.5 * P * N) * max($T_{DRX}$, $T_{SSB}$)) |
| DRX cycle > 320 | ceil(10 * P * N) * $T_{DRX}$ | ceil(5 * P * N) * $T_{DRX}$ |

NOTE:
$T_{SSB}$ is the periodicity of SSB configured for RLM.
$T_{DRX}$ is the DRX cycle length.

CSI-RS Based Radio Link Monitoring

Each CSI-RS based RLM-RS resource is configured for a PCell and/or a PSCell provided that the CSI-RS configured for RLM are actually transmitted within UE active DL BWP during the entire evaluation period specified below.

TABLE RLM.3-1

PDCCH transmission parameters for out-of-sync

| Attribute | Value for BLER pair#0 | Value for BLER pair#1 |
|---|---|---|
| DCI format | 1-0 | TBD |
| Number of control OFDM symbols | Same as the number of symbols of CORESET QCLed with respective CSI-RS for RLM | |
| Aggregation level (CCE) | [8] | |
| Ratio of hypothetical PDCCH RE energy to average CSI-RS RE energy | [4]dB | |
| Ratio of hypothetical PDCCH DMRS energy to average CSI-RS RE energy | [4]dB | |

TABLE RLM.3-1-continued

PDCCH transmission parameters for out-of-sync

| Attribute | Value for BLER pair#0 | Value for BLER pair#1 |
|---|---|---|
| Bandwidth (MHz) | Same as the number of PRBs of CORESET QCLed with respective CSI-RS for RLM | |
| Sub-carrier spacing (kHz) | Same as the SCS of CORESET QCLed with respective CSI-RS for RLM | |
| DMRS precoder granularity | REG bundle size | |
| REG bundle size | 6 | |
| CP length | Same as the CP length of CORESET QCLed with respective CSI-RS for RLM | |
| Mapping from REG to CCE | Distributed | |

TABLE RLM.3-2

PDCCH transmission parameters for in-sync

| Attribute | Value for BLER pair#0 | Value for BLER pair#1 |
|---|---|---|
| DCI payload size | [1-0] | TBD |
| Number of control OFDM symbols | Same as the number of symbols of CORESET QCLed with respective CSI-RS for RLM | |
| Aggregation level (CCE) | [4] | |
| Ratio of hypothetical PDCCH RE energy to average CSI-RS RE energy | [0]dB | |
| Ratio of hypothetical PDCCH DMRS energy to average CSI-RS RE energy | [0]dB | |
| Bandwidth (MHz) | Same as the number of PRBs of CORESET QCLed with respective CSI-RS for RLM | |
| Sub-carrier spacing (kHz) | Same as the SCS of CORESET QCLed with respective CSI-RS for RLM | |
| DMRS precoder granularity | REG bundle size | |
| REG bundle size | 6 | |
| CP length | Same as the CP length of CORESET QCLed with respective CSI-RS for RLM | |
| Mapping from REG to CCE | Distributed | |

The UE may be able to evaluate whether the downlink radio link quality on the configured RLM-RS resource estimated over the last $T_{Evaluate\_out\_CSI-RS}$ [ms] period becomes worse than the threshold $Q_{out\_CSI-RS}$ within $T_{Evaluate\_out\_CSI-RS}$ [ms] evaluation period. Similarly, the UE may be able to evaluate whether the downlink radio link quality on the configured RLM-RS resource estimated over the last $T_{Evaluate\_in\_CSI-RS}$ [ms] period becomes better than the threshold $Q_{in\_CSI-RS}$ within $T_{Evaluate\_in\_CSI-RS}$ [ms] evaluation period. $T_{Evaluate\_out\_CSI-RS}$ and $T_{Evaluate\_in\_CSI-RS}$ are defined in Table RLM.3-3 for FR1. $T_{Evaluate\_out\_CSI-RS}$ and $T_{Evaluate\_in\_CSI-RS}$ are defined in Table RLM.3-4 for FR2, where N=1, if the CSI-RS resource configured for RLM is spatially QCLed and TDMed to CSI-RS resources configured for BM or SSBs configured for BM, and the QCL association is known to UE.

For FR1, $P=1/(1-T_{CSI-RS}/MGRP)$, when in the monitored cell there are measurement gaps configured for intra-frequency, inter-frequency or inter-RAT measurements, which are overlapping with some but not all occasions of the CSI-RS; and P=1 when in the monitored cell there are no measurement gaps overlapping with any occasion of the CSI-RS.

For FR2, P=1, when RLM-RS is not overlapped with measurement gap and also not overlapped with SMTC occasion. $P=1/(1-T_{CSI-RS}/MGRP)$, when RLM-RS is partially overlapped with measurement gap and RLM-RS is not overlapped with SMTC occasion ($T_{CSI-RS}$<MGRP). $P=1/(1-T_{CSI-RS}/T_{SMTCperiod})$, when RLM-RS is not overlapped with measurement gap and RLM-RS is partially overlapped with SMTC occasion ($T_{CSI-RS}$<$T_{SMTCperiod}$). P is $P_{sharing\ factor}$, when RLM-RS is not overlapped with measurement gap and RLM-RS is fully overlapped with SMTC occasion ($T_{CSI-RS}=T_{SMTCperiod}$). P is $1/(1-T_{CSI-RS}/MGRP-T_{CSI-RS}/T_{SMTCperiod})$, when RLM-RS is partially overlapped with measurement gap and RLM-RS is partially overlapped with SMTC occasion (TCSI-RS<$T_{SMTCperiod}$) and SMTC occasion is not overlapped with measurement gap and $T_{SMTCperiod} \neq MGRP$ or $T_{SMTCperiod}=MGRP$ and $T_{CSI-RS}<0.5*T_{SMTCperiod}$. P is $1/(1-T_{CSI-RS}/MGRP)*P_{sharing\ factor}$, when RLM-RS is partially overlapped with measurement gap and RLM-RS is partially overlapped with SMTC occasion ($T_{CSI-RS}<T_{SMTCperiod}$) and SMTC occasion is not overlapped with measurement gap and $T_{SMTCperiod}=MGRP$ and $T_{CSI-RS}=0.5*T_{SMTCperiod}$. P is $1/\{1-T_{CSI-RS}/min(T_{SMTCperiod},MGRP)\}$, when RLM-RS is partially overlapped with measurement gap and RLM-RS is partially overlapped with SMTC occasion ($T_{CSI-RS}<T_{SMTCperiod}$) and SMTC occasion is partially overlapped with measurement gap ($T_{SMTCperiod}$<MGRP). P is $1/(1-T_{CSI-RS}/MGRP)*P_{sharing\ factor}$, when RLM-RS is partially overlapped with measurement gap and RLM-RS is fully overlapped with SMTC occasion ($T_{CSI-RS}=T_{SMTCperiod}$) and SMTC occasion is partially overlapped with measurement gap ($T_{SMTCperiod}$>MGRP). As above, a longer evaluation period would be expected if the combination of RLM-RS, SMTC occasion and measurement gap configurations does not meet the previous conditions. The values of $M_{out}$ and $M_{in}$ used in Table RLM.3-3 and Table RLM.3-4 are defined as $M_{out}=20$ and $M_{in}=10$, if the CSI-RS resource configured for RLM is transmitted with Density=3.

TABLE RLM.3-3

Evaluation period $T_{Evaluate\_out}$ and $T_{Evaluate\_in}$ for FR1

| Configuration | $T_{Evaluate\_out}$ (ms) | $T_{Evaluate\_in}$ (ms) |
|---|---|---|
| non-DRX | max(200, ceil($M_{out} \times P$) × $T_{CSI-RS}$) | max(100, ceil($M_{in} \times P$) × $T_{CSI-RS}$) |
| DRX ≤ 320 ms | max(200, ceil(1.5 × $M_{out} \times P$) × max($T_{DRX}$, $T_{CST-RS}$)) | max(100, ceil(1.5 × $M_{in} \times P$) × max($T_{DRX}$, $T_{CSI-RS}$)) |
| DRX > 320 ms | ceil($M_{out} \times P$) × $T_{DRX}$ | ceil($M_{in} \times P$) × $T_{DRX}$ |

NOTE:

$T_{CSI-RS}$ is the periodicity of CSI-RS resource configured for RLM.

$T_{DRX}$ is the DRX cycle length.

TABLE RLM.3-4

Evaluation period $T_{Evaluate\_out}$ and $T_{Evaluate\_in}$ for FR2

| Configuration | $T_{Evaluate\_out}$ (ms) | $T_{Evaluate\_in}$ (ms) |
| --- | --- | --- |
| non-DRX | max(200, ceil($M_{out}$ × P × N) × $T_{CSI-RS}$) | max(100, ceil($M_{in}$ × P × N) × $T_{CSI-RS}$) |
| DRX ≤ 320 ms | max(200, ceil(1.5 × $M_{out}$ × P × N) × max($T_{DRX}$, $T_{CSI-RS}$)) | max(100, ceil(1.5 × $M_{in}$ × P × N) × max($T_{DRX}$, $T_{CSI-RS}$)) |
| DRX > 320 ms | ceil($M_{out}$ × P × N) × $T_{DRX}$ | ceil($M_{in}$ × P × N) × $T_{DRX}$ |

NOTE:
$T_{CSI-RS}$ is the periodicity of CSI-RS resource configured for RLM.
$T_{DRX}$ is the DRX cycle length.

L1 Indication

For FR1, P=1/(1−$T_{CSI-RS}$/MGRP), when in the monitored cell measurement gaps may be configured for intra-frequency, inter-frequency or inter-RAT measurements, which may overlap with some but not all occasions of the CSI-RS; and P=1 when in the monitored cell there are no measurement gaps overlapping with any occasion of the CSI-RS.

When the downlink radio link quality on all the configured RLM-RS resources is worse than $Q_{out}$, Layer 1 of the UE may send an out-of-sync indication for the cell to the higher layers. A Layer 3 filter may be applied to the out-of-sync indications. When the downlink radio link quality on at least one of the configured RLM-RS resources is better than $Q_{in}$, Layer 1 of the UE may send an in-sync indication for the cell to the higher layers. A Layer 3 filter is to be applied to the in-sync indications. The out-of-sync and in-sync evaluations for the configured RLM-RS resources may be performed. Two successive indications from Layer 1 is to be separated by at least $T_{Indication\_interval}$. When DRX is not used $T_{Indication\_interval}$ may be max(10 ms, $T_{RLM-RSM}$), where $T_{RLM,M}$ is the shortest periodicity of all configured RLM-RS resources for the monitored cell, which corresponds to $T_{SSB}$ if the RLM-RS resource is SSB, or $T_{CSI-RS}$ if the RLM-RS resource is CSI-RS. If DRX is used, upon the start of the T310 timer, the UE may monitor the configured RLM-RS resources for recovery using the evaluation period and Layer 1 indication interval corresponding to the non-DRX mode until the expiry or stop of T310 timer.

Scheduling Availability of UE During Radio Link Monitoring

When the reference signal to be measured for RLM has a different subcarrier spacing than the PDSCH/PDCCH and on frequency range FR2, there may be restrictions on the scheduling availability as described below.

There may be no scheduling restrictions due to radio link monitoring performed with a same subcarrier spacing as PDSCH/PDCCH on FR1. For a UE that supports simultaneousRxDataSSB-DiffNumerology there may be no restrictions on scheduling availability due to radio link monitoring based on use of the SSB as the RLM-RS. For a UE that does not support simultaneousRxDataSSB-DiffNumerology, the UE may not be expected to transmit a PUCCH/PUSCH or receive a PDCCH/PDSCH on SSB symbols to be measured for radio link monitoring.

When intra-band carrier aggregation is performed, the scheduling restrictions may apply to all serving cells on the band due to radio link monitoring performed on FR1 serving PCell or PSCell in the same band. When inter-band carrier aggregation within FR1 is performed, there may be no scheduling restrictions on FR1 serving cell(s) in the bands due to radio link monitoring performed on FR1 serving PCell or PSCell in different bands.

The UE may not be expected to transmit a PUCCH/PUSCH or receive a PDCCH/PDSCH on RLM-RS symbols to be measured for radio link monitoring, except for RMSI PDCCH/PDSCH and PDCCH/PDSCH which may or may not be received by an RRC_CONNECTED mode UE.

There may be no scheduling restrictions on FR1 serving cell(s) due to radio link monitoring performed on FR2 serving PCell and/or PSCell. Similarly, there may be no scheduling restrictions on FR2 serving cell(s) due to radio link monitoring performed on FR1 serving PCell and/or PSCell.

Link Recovery Procedures

A UE can be provided, for a serving cell, with a set $\bar{q}_0$ of periodic CSI-RS resource configuration indexes by higher layer parameter failureDetectionResources and with a set $\bar{q}_1$ of periodic CSI-RS resource configuration indexes and/or SS/PBCH block indexes by higher layer parameter candidateBeamRSList for radio link quality measurements on the serving cell. If the UE is not provided with higher layer parameter failureDetectionResources, the UE may determine the set $\bar{q}_0$ to include SS/PBCH block indexes and periodic CSI-RS resource configuration indexes with the same values as the RS indexes in the RS sets indicated by the TCI states for respective control resource sets that the UE uses for monitoring the PDCCH. The UE may expect the set $\bar{q}_0$ to include up to two RS indexes and, if there are two RS indexes, the set $\bar{q}_0$ may include only RS indexes with QCL-TypeD configuration for the corresponding TCI states. The UE may expect a single port RS in the set $\bar{q}_0$.

The threshold $Q_{out,LR}$ may correspond to the default value of higher layer parameter rlmInSyncOutOfSyncThreshold and to the value provided by higher layer parameter rsrp-ThresholdSSB, respectively. The physical layer in the UE may assess the radio link quality according to the set $\bar{q}_0$ of resource configurations against the threshold $Q_{out,LR}$. For the set $\bar{q}_0$, the UE may assess the radio link quality only according to periodic CSI-RS resource configurations or SS/PBCH blocks that are quasi co-located, with the DM-RS of PDCCH receptions monitored by the UE. The UE may apply the $Q_{in,LR}$ threshold to the L1-RSRP measurement obtained from a SS/PBCH block. The UE may apply the $Q_{in,LR}$ threshold to the L1-RSRP measurement obtained for a CSI-RS resource after scaling a respective CSI-RS reception power with a value provided by higher layer parameter powerControlOffsetSS.

The physical layer in the UE may provide an indication to higher layers when the radio link quality for all corresponding resource configurations in the set $\bar{q}_0$ that the UE uses to assess the radio link quality is worse than the threshold $Q_{out,LR}$. The physical layer may inform the higher layers when the radio link quality is worse than the threshold $Q_{out,LR}$ with a periodicity determined by the maximum between the shortest periodicity of periodic CSI-RS configurations or SS/PBCH blocks in the set $\bar{q}_0$ that the UE uses to assess the radio link quality and 2 msec.

Upon request from higher layers, the UE may provide to higher layers the periodic CSI-RS configuration indexes and/or SS/PBCH block indexes from the set $\bar{q}_1$ and the corresponding L1-RSRP measurements that are larger than or equal to the corresponding thresholds. A UE may be provided with a control resource set through a link to a search space set provided by higher layer parameter recoverySearchSpaceId for monitoring the PDCCH in the control resource set. If the UE is provided higher layer parameter recoverySearchSpaceId, the UE may not expect to be provided another search space set for monitoring PDCCH in the control resource set associated with the search space set provided by recoverySearchSpaceId.

The UE may receive by higher layer parameter PRACH-ResourceDedicatedBFR, a configuration for PRACH transmission. For PRACH transmission in slot n and according to antenna port quasi co-location parameters associated with periodic CSI-RS configuration or SS/PBCH block with index $q_{new}$ provided by higher layers, the UE may monitor the PDCCH in a search space provided by higher layer parameter recoverySearchSpaceId for detection of a DCI format with a cyclic redundancy check (CRC) scrambled by C-RNTI starting from slot n+4 within a window configured by higher layer parameter BeamFailureRecoveryConfig. For the PDCCH monitoring and for the corresponding PDSCH reception, the UE may assume the same antenna port quasi-collocation parameters with index $q_{new}$ until the UE receives by higher layers an activation for a TCI state or any of the parameters TCI-StatesPDCCH-ToAddlist and/or TCI-StatesPDCCH-ToReleaseList. After the UE detects a DCI format with CRC scrambled by C-RNTI in the search space provided by recoverySearchSpaceId, the UE may monitor PDCCH candidates in the search space provided by recoverySearchSpaceId until the UE receives a MAC CE activation command for a TCI state or higher layer parameters TCI-StatesPDCCH-ToAddlist and/or TCI-StatesPDCCH-ToReleaseList. If the UE is not provided a control resource set for a search space set provided recoverySearchSpaceId or if the UE is not provided recoverySearchSpaceId, the UE may not expect to receive a PDCCH order triggering a PRACH transmission.

In general, the gNB can configure the UE with up to {2, 4 or 8} radio link monitoring reference signal resources (depending on the carrier frequency range of special cell (spCell)) to measure the radio link quality. As above, the RLM-RS resources can be a CSI-RS resource, an SSB resource or a mix of both the CSI-RS resources and SSB resources. For the L1 assessment (after which the UE provides an in-sync (IS) or out-of-sync (OOS) indication), the hypothetical BLER may be used to determine whether the UE is in-sync or out-of-sync conditions. A UE may assume that it is in an in-sync condition if at least one out of the configured RLM-RS resources is estimated to have a hypothetical BLER below a configurable threshold. On the other hand, the UE may assume that it is in an out-of-sync condition only if all configured RLM-RS resources are estimated to have a hypothetical BLER above another configurable threshold. For non-discontinuous reception (DRX) mode, the in-sync and out-of-sync assessment may be periodic, with the assessment being every maximum of either 10 milliseconds (ms) or the shortest periodicity of RLM-RS resource configuration. When the UE is in DRX mode, the assessment may be performed in a manner similar to LTE assessment in terms of number of DRX cycles.

Radio access network group 4 (RAN4) specification also defines the evaluation period in which the UE may be able to evaluate the in-sync and out-of-sync condition for the RLM-RS resource. NR-based access to the unlicensed spectrum has been started in 3GPP release 16 (Rel-16). The 3GPP Release 15 (Rel-15) NR system is, however, designed to operate on the licensed spectrum. The NR-unlicensed, a short-hand notation of the NR-based access to unlicensed spectrum, is a technology that enables the operation of NR system on unlicensed spectrum. Operation of in-sync and out-of-sync determination has In Rel-16, hypothetical BLER estimation may be evaluated for each RLM-RS resource to check whether each RLM-RS resource measurement fulfilled the in-sync or out-of-sync BLER threshold during the evaluation period. However, the base station may adhere to a listen-before-talk (LBT) or other contention-based mechanism to provide RLM-RS transmissions on the unlicensed band and allow channel assessment on channels of the unlicensed band. Unlike licensed band transmissions, if the unlicensed band channel is considered busy, e.g. the noise level is above a predetermined threshold, the transmission by the base station of the RLM-RS resource sample on the RLM-RS resource may not occur. In some cases, the base station may miss transmission on the unlicensed band of one or more RLM-RS resource samples during the evaluation period due to LBT. This may cause the hypothetical BLER estimation by the UE of the RLM-RS resource to have reduced accurate as such an estimate may be affected by the missing RLM-RS resource samples. That is, accuracy may be affected due to fewer samples or measurements being corrupted by the missing samples. This may result in an incorrect assessment, such as an out-of-sync indication even when the UE might be in the coverage of that RLM-RS resource. On the other hand, not considering missing RLM-RS resource may result in unacceptable delays in declaring out-of-sync or retracting from out-of-sync, if the UE L1 does not indicate in-sync or out-of-sync when the UE cannot detect any of the configured RLM-RS resource samples of the RLM-RS resource during the evaluation period. Accordingly, various radio link monitoring (RLM) and radio link failure (RLF) mechanisms may be used to compensate for missing RLM-RS resource sample due to the LBT procedure.

Figure 3:
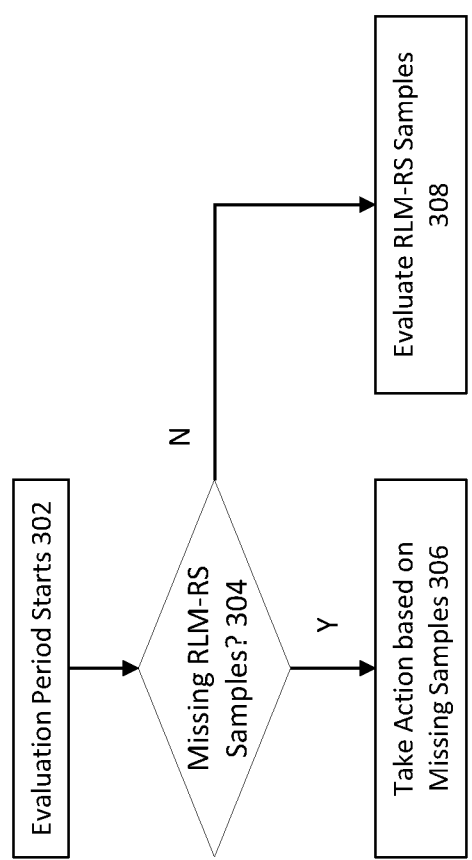
FIG. 3 illustrates an example of a flowchart of reference signal evaluation in accordance with some embodiments.

FIG. 3 illustrates an example of a flowchart of reference signal evaluation in accordance with some embodiments. The UE L1 may adjust the evaluation to reduce the performance degradation of missing RLM-RS resource samples when detecting the RLM-RS resource on the unlicensed band. The adjustment, in other embodiments, may be avoided when the licensed band is used by the base station for transmission of the RLM-RS resource samples. In some embodiments, at operation 302 the UE L1 may detect RLM-RS resource samples of the RLM-RS resource during the evaluation period.

At operation 304, the UE L1 may perform the in-sync and out-of-sync evaluation of the RLM-RS resource. To perform the in-sync and out-of-sync evaluation, the UE L1 may determine whether one or more RLM-RS resource samples of the RLM-RS resource are missing.

If the UE L1 determines that RLM-RS resource samples are not missing, the UE may proceed at operation 308. In operation 308, the UE L1 may measure the RLM-RS resource samples and make a determination whether the UE is in-sync or out-of-sync. The UE L1 may provide this information to higher layers, such as the UE RRC layer.

If the UE L1 determines that RLM-RS resource samples are missing, at operation 306 the UE L1 may take one of a number of courses of action. For example, the UE L1 may take into consideration missing RLM-RS resource samples. In particular, if the missing RLM-RS resource samples can be detected to be missing by the UE L1, at operation 306 the evaluation for the configured RLM-RS resource may skip (not consider) those samples in the evaluation. The UE L1 may determine that the RLM-RS resource samples are missing by an energy detection, and/or use of a new BLER threshold for a missing RLM-RS resource sample, that indicates the signal level is near or at the noise floor. The proximity to the noise floor may be, for example, set by 3GPP standard or left up to UE implementation, for example, within 5% or 10% of the noise floor. The RLM-RS detection may be performed based on threshold values for the detection operation that are fixed in the 3GPP specification or signaled by the network via, e.g., dedicated radio resource control (RRC) signaling or in a system information block (SIB).

In some cases, the UE may be unable to determine whether the RLM-RS transmission is missing or non-detection of the RLM-RS resource samples is due to poor detection. Thus, instead of skipping the in-sync and out-of-sync evaluation of RLM-RS resource, the evaluation may still consider the missing RLM-RS resource samples but provide weighting of the missing RLM-RS resource samples. The weighting may be dependent on, for example, the confidence level of the RLM-RS resource sample being missing (e.g., the proximity of the measurement to the noise floor) and/or the measurement (and perhaps confidence level of) other RLM-RS resource sample measurements during the detection period, among other factors.

Alternatively, or in addition, at operation 306 during the in-sync and out-of-sync assessment, if one or more missing RLM-RS resource samples can be detected, the L1 may not consider the RLM-RS resource where samples are missing in the in-sync and out-of-sync assessment. This means that the L1 may not provide an in-sync or out-of-sync indication if it is not able to detect all samples. This may increase the length of time for the UE to determine whether or not the UE is out-of-sync.

In some embodiments, rather than ignoring the missing RLM-RS resource samples, new assessment criteria may be introduced based on missing RLM-RS resource samples. The new assessment criteria may include assessing the number of configured RLM-RS resources affected by missing RLM-RS resource sample. If the number is above a certain number (configured threshold), the UE L1 may also send a missing RS indication to the RRC layer. The new assessment criteria may include the higher layer (e.g. RRC or MAC layer) counting the number of consecutive of such missing RS indications and can use this number either with or without considering the number of in-sync indications and out-of-sync indications to declare RLF for the Pcell and/or PSCell. The RRC layer may in response perform re-establishment if the RLF is on the PCell or initiate a report to the base station (e.g., gNB) if the RLF is on the PSCell or SCell. The report may be used by the network to change the BWP of the PCell/PSCell or even change the Pcell/PSCell.

Alternatively, or in addition, the periodicity of a configured RLM-RS resource may be increased by the gNB compared to licensed band RLM-RS resources. Thus, at operation 306 the UE may transmit feedback to the gNB regarding the missing samples before the gNB adjusts this parameter. This may provide an increased number of RLM-RS resource samples within the in-sync/out-of-sync evaluation period.

Alternatively, or in addition, at operation 306 the number of configured RLM resources may be increased by the gNB compared to licensed band RLM-RS resources. Thus, at operation 306 the UE may transmit feedback to the gNB regarding the missing samples before the gNB adjusts this parameter. This may reduce the probability of declaring out-of-sync since an out-of-sync declaration depends on all configured RLM-RS resources being above the configured BLER threshold.

Alternatively, or in addition, the RLM-RS may be configured as a part of cell discovery reference signal (DRS) by the gNB. Thus, at operation 306 the UE may transmit feedback to the gNB regarding the missing samples before the gNB adjusts this parameter. The DRS may be limited to only being transmitted inside an SSB measurement timing configuration (SMTC) or DRS measurement timing configuration (DMTC). This is to say that rather than the RLM-RS resource samples being transmitted at predetermined (fixed) RLM-RS resources within the RLM-RS detection period, the RLM-RS resource samples may occur at any point within the RLM-RS evaluation period. While this may increase the amount of time the UE is to listen for the RLM-RS resource samples during the RLM-RS evaluation period, it may reduce the number of missing RLM-RS resource samples.

Currently discussions regarding the RLM-RS resource configuration for NR-U are ongoing. Increasing the RLM-RS resources available for in-sync/out-of-sync evaluation may help to ensure the accuracy of detecting in-sync/out-of-sync conditions. RAN1 had agreed to the following on the configuration of the RLM-RS resource: it is considered beneficial to configure DMTC(s) (DRS Measurement Time Configuration) in which UEs can perform measurements; in addition, DRS-based RLM for unlicensed SpCell is performed inside the DMTC(s). In this case, RLM DMTC may coincide with DRS transmission window and CSI-RS-based RLM may be performed outside of DMTC(s).

Also, an RLM measurement window for serving cell RLM measurements based on SSBs in the DRS is supported for in-sync and out-of-sync evaluations. However, the manner in which the RLM measurement window is indicated or determined and relation to DRS transmission window; whether or not an SSB can fall outside the measurement window and, if so, whether it can be used for in-sync and out-of-sync evaluations; and the relationship of RLM measurements based on CSI-RS to the measurement window have not been determined. If the RLM DMTC is periodic in nature, the periodicity of the configured RLM-RS resource can be increased with the periodicity of the DMTC. Outside of the DMTC, it may depend on how the configuration of the CSI-RS based RLM can be configured to allow for more RLM-RS resources.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. A method, comprising:
monitoring a plurality of Radio Link Monitoring Reference Signals (RLM-RS) resources or samples from a base station on an unlicensed band during an in-sync evaluation period, wherein the in-sync evaluation period is based on a periodicity of a synchronization signal block (SSB) configured for radio link monitoring (RLM);
evaluating an in-sync condition within the in-sync evaluation period with an increased number of RLM-RS resources or samples within the in-sync evaluation period to compensate for missing RLM-RS resources or samples; and
determining whether to provide an in-sync indication via layer-1 signaling based on the evaluating.

2. The method of claim 1, further comprising:
determining a number of consecutive missing RLM-RS resource samples during the in-sync evaluation period, including determining the number of consecutive missing RLM-RS resource samples by energy detection of the RLM-RS resources.

3. The method of claim 1,
wherein the RLM-RS resources have an increased periodicity compared to licensed band RLM-RS resources.

4. The method of claim 1,
wherein the RLM-RS resources have a larger number during the in-sync evaluation period compared to licensed band RLM-RS resources.

5. The method of claim 1,
wherein the in-sync evaluation period is further based on a discontinuous reception cycle (DRX) cycle length.

6. The method of claim 1, further comprising:
performing, in response to determining to declare radio link failure, a re-establishment with the base station when the radio link failure is on a primary cell.

7. The method of claim 1, further comprising:
initiating, in response to determining to declare radio link failure, reporting to the base station when the radio link failure is on a primary secondary cell or a secondary cell, wherein the reporting aids the base station in changing a bandwidth part of the primary secondary cell or the secondary cell.

8. The method of claim 1, further comprising:
determining a number of consecutive missing RLM-RS resources or samples during the in-sync evaluation period, wherein determining whether to provide an in-sync indication via layer-1 is further based on the number of missing RLM-RS resource samples during the in-sync evaluation period.

9. A non-transitory computer-readable memory medium storing program instructions executable by one or more processors of a user equipment (UE) to cause the UE to:
monitor a plurality of Radio Link Monitoring Reference Signals (RLM-RS) resources or samples from a base station at each of a plurality of RLM-RS resources on an unlicensed band during an in-sync evaluation period, wherein the in-sync evaluation period is based on a periodicity of a synchronization signal block (SSB) configured for radio link monitoring (RLM);
evaluate an in-sync condition within the in-sync evaluation period with an increased number of RLM-RS resources or samples within the in-sync evaluation period to compensate for missing RLM-RS resources or samples; and
determine whether to provide an in-sync indication via layer-1 signaling based on the evaluating.

10. The non-transitory computer-readable memory medium of claim 9,
wherein the RLM-RS resource samples comprise synchronization signal block resources.

11. The non-transitory computer-readable memory medium of claim 9,
wherein the RLM-RS resource samples comprise channel state reference signal resources.

12. The non-transitory computer-readable memory medium of claim 9,
wherein the RLM-RS resource samples are cell discovery reference signals.

13. The non-transitory computer-readable memory medium of claim 12,
wherein the cell discovery reference signals are received within a synchronization signal block measurement timing configuration.

14. The non-transitory computer-readable memory medium of claim 9,
wherein the program instructions are further executable by one the or more processors of the UE to cause the UE to
determine a number of consecutive missing RLM-RS resources or samples during the in-sync evaluation period, wherein determining whether to provide an in-sync indication via layer-1 is further based on the number of missing RLM-RS resource samples during the in-sync evaluation period.

15. A baseband processor comprising processing circuitry configured to:
monitor a plurality of Radio Link Monitoring Reference Signals (RLM-RS) resources or samples from a base station at each of a plurality of RLM-RS resources on an unlicensed band during an in-sync evaluation period, wherein the in-sync evaluation period is based on a periodicity of a synchronization signal block (SSB) configured for radio link monitoring (RLM);
evaluate an in-sync condition within the in-sync evaluation period with an increased number of RLM-RS resources or samples within the in-sync evaluation period to compensate for missing RLM-RS resources or samples; and
determine whether to provide an in-sync indication via layer-1 signaling based on the evaluating.

16. The baseband processor of claim 15,
wherein the RLM-RS resource samples comprise synchronization signal block resources.

17. The baseband processor of claim 15,
wherein the RLM-RS resource samples comprise channel state reference signal resources.

18. The baseband processor of claim 15,
wherein the RLM-RS resource samples are cell discovery reference signals.

19. The baseband processor of claim 18,
wherein the cell discovery reference signals are received within a synchronization signal block measurement timing configuration.

20. The baseband processor of claim 15,
wherein the processing circuitry is further configured to:
determine a number of consecutive missing RLM-RS resources or samples during the in-sync evaluation period, wherein determining whether to provide an in-sync indication via layer-1 is further based on the number of missing RLM-RS resource samples during the in-sync evaluation period.

\* \* \* \* \*